United States Patent

[11] 3,578,273

| [72] | Inventor | Thomas P. Mulgrave<br>Glen Mills, Pa. |
|---|---|---|
| [21] | Appl. No. | 793,125 |
| [22] | Filed | Jan. 22, 1969 |
| [45] | Patented | May 11, 1971 |
| [73] | Assignee | The United States of America as represented by the Secretary of the Navy |

[54] REUSABLE HOLDBACK RELEASE DEVICE
7 Claims, 6 Drawing Figs.

| [52] | U.S. Cl. | 244/115 |
|---|---|---|
| [51] | Int. Cl. | B64f 1/12 |
| [50] | Field of Search | 244/110, 135; 24/207, 230.5; 244/63, 115, 116 |

[56] References Cited

UNITED STATES PATENTS

| 2,444,919 | 7/1948 | Cotton et al. | 244/63 |
| 2,477,569 | 8/1949 | Beirise | 244/63X |
| 2,727,291 | 12/1955 | Hamblin | 244/63X |
| 3,067,972 | 12/1962 | Mosher | 244/135 |

FOREIGN PATENTS

| 764,249 | 12/1956 | Great Britain | 244/115 |

*Primary Examiner*—Milton Buchler
*Assistant Examiner*—Paul E. Sauberer
*Attorneys*—E. J. Brower and A. W. Collins ABSTRACT: The present invention relates to novel and improved apparatus for restraining an aircraft from a catapult assisted takeoff until a predetermined required launch force is developed. The improved aircraft restraining or holdback apparatus includes a pair of coupling elements, one of which is secured to the aircraft and the other of which is secured to the aircraft takeoff surface. In their intercoupled condition, flexible fingers of the one element engage an annular groove in a piston operated component of the other element. A sleeve on the said other element normally prevents disengagement of the fingers from the groove until a preset axial load on the piston develops a pressure that permits movement of the piston to a position beyond the sleeve. When this occurs, the fingers of the one coupling element disengage themselves from the groove of the other coupling element, the holdback device is released and the aircraft begins its takeoff run.

Patented May 11, 1971 3,578,273
2 Sheets-Sheet 1
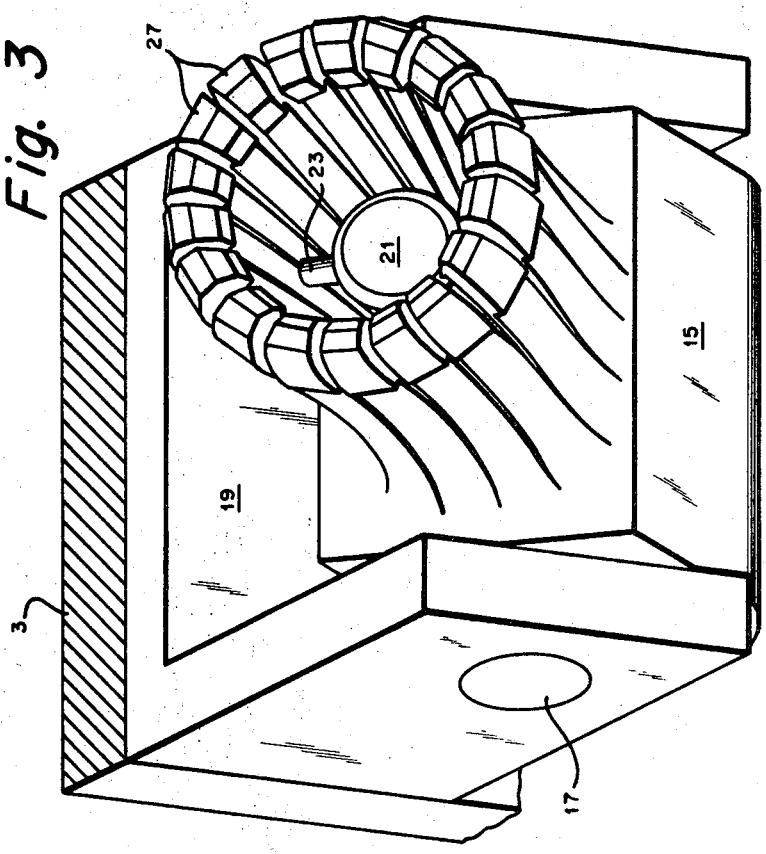
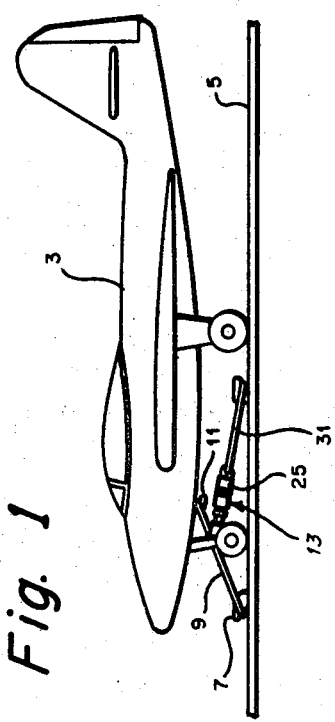
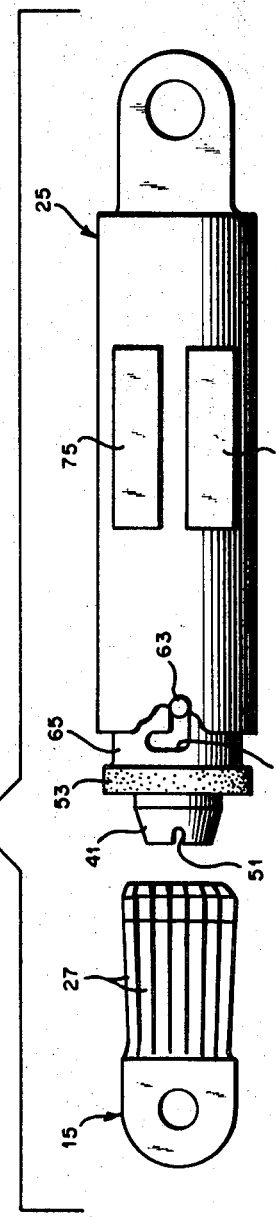
INVENTOR.
THOMAS P. MULGRAVE
BY
ATTORNEY

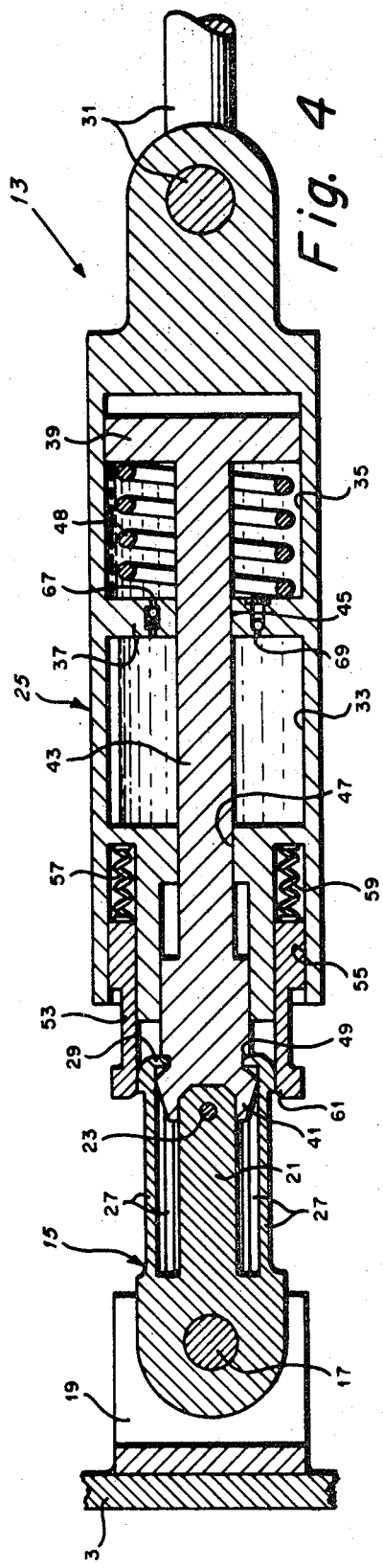

3,578,273

REUSABLE HOLDBACK RELEASE DEVICE

BACKGROUND OF INVENTION

In the art of launching an aircraft from the confined flight deck area of an aircraft carrier or the like, it is customary to supplement the launching force of the aircraft engine with that of a suitable catapult device. During a launching operation, it is imperative to be certain that adequate launching power is available for the launch before permitting the aircraft to initiate its takeoff run. It is therefore customary to restrain the aircraft from its launch until a predetermined adequate launching force is developed. Although various types of aircraft holdback devices have been developed in the past for this purpose, considerable difficulty has been experienced heretofore in devising apparatus which meets the many requirements of safety, reliability, durability and practicability.

It is therefore a principal object of the invention to provide novel and improved aircraft holdback apparatus which meets the various requirements of the prelaunch operation with reliability and facility.

It is a further object of the invention to provide novel and improved aircraft holdback apparatus which may be used and reused repeatedly in a large number of launches under anticipated service conditions.

It is a further object of the invention to provide novel and improved aircraft holdback apparatus which avoids a foreign object hazard to operation personnel inasmuch as the release does not depend on the rupture of a tension bar or shear pin.

It is a further object of the invention to provide novel and improved aircraft holdback apparatus which can be readily adjusted to release the aircraft at any desired prelaunch axial load.

It is a further object of the invention to provide novel and improved aircraft holdback apparatus which is readily releasable at any load from idle engine thrust to full engine thrust.

Other objects and many of the attendant advantages of this invention will be readily appreciated as the same becomes better understood by reference to the following detailed description when considered in connection with the accompanying drawing wherein:

FIG. 1 is a side elevational view of an aircraft in a prelaunch position wherein a preferred embodiment of the invention is illustrated;

FIG. 2 is an enlarged side view of the coupling elements of the improved holdback apparatus of the invention;

FIG. 3 is a perspective view of the holdback apparatus coupling element which is secured to the aircraft;

FIG. 4 is a cross-sectional view of the coupling elements of the apparatus when they are intercoupled one to the other and the locking sleeve is in position to prevent their disengagement;

FIG. 5 is an enlarged cross-sectional view of one of the ports in the coupling element which is secured to the aircraft takeoff surface; and FIG. 6 is an enlarged cross-sectional view of another of the ports in the coupling element which is secured to the aircraft takeoff surface.

Referring now to the various FIGS. of the drawing, it will be noted that the aircraft 3 is shown ready for a launch from the flight deck of an aircraft carrier or other suitable launching surface 5. The launching force is transmitted from a conventional catapult device to the aircraft 3 through the catapult shuttle 7, the launching bridle 9 and the aircraft tow hook 11. Until the required launching force is developed, the aircraft is restrained from its launch by the holdback assembly 13.

The aircraft holdback assembly 13 includes the coupling element 15 which is pivotably secured to the aircraft 3 preferably by means of the pin 17 that extends between the bifurcated ends of a suitable clevis or the like 19 attached to the aircraft. The cylindrical member 21, which projects downwardly along the axis of the coupling element 15 and includes the integral radially disposed pin 23 adjacent the end thereof, controls the rotational orientation of coupling elements 15 and 25 of the holdback device when they are coupled one to the other in a manner which will be more apparent hereinafter. The elongated flexible fingers 27 of the coupling element 15 are circumferentially disposed about the outer periphery of the cylindrical member 21 and project inwardly adjacent their outer extremities as at 29 to provide a predetermined reduced diameter inner peripheral surface.

The aircraft holdback assembly 13 also includes the coupling element 25 which is secured to a suitable conventional deck cleat or the like in the launching surface 5 by means of a holdback rod or cable 31. The interior of the coupling element 25 is divided into the cylindrical oil filled chambers 33 and 35 by the interior wall or the like 37. Piston 39 is positioned in chamber 35 and is connected to the enlarged tapered locking head 41 by the shaft 43 that extends through apertures 45 and 47 respectively in the interior wall 37 and one end of the element 25. The spring element 48 normally biases the piston 39 towards its innermost position in member 25. The aperture 47 in the element 25 and the contiguous portions of the shaft 43 are preferably square in cross section or otherwise suitably contoured so as to limit rotary movement of the shaft and piston in the element 25. The annular groove 49 in the locking head 41 is adapted to receive the inwardly projecting extremities of the flexible fingers 27 of element 15 in a manner which will be more apparent hereinafter when elements 15 and 25 are coupled together. The radial slot 51 in the end of the locking head 41 receives the outwardly extending pin 23 near the end of the cylindrical member 21 and controls the relative rotary dispositions of elements 15 and 25 when they are coupled one to the other. The sleeve 53 is slidably positioned in the annular slot 55 in the end of element 25 and is biased toward its outermost position therein by spring elements 57 and 59. When the coupling elements 15 and 25 are interconnected, the inwardly projecting annular flange 61 on the outer end of sleeve 53 overlies the ends of the flexible fingers 27 of coupling element 15 and prevents their disengagement from groove 49 when the sleeve occupies its normal extended position in element 25 and the shaft 43 and its integral locking head 41 occupy their normal retracted position in element 25. The screw or pin 63 in element 25 projects into the L-shaped slot 65 in sleeve 53 and provides a temporary means for securing the sleeve in its retracted position in element 25.

Ports 67 and 69 are disposed as shown in the interior wall 37 so as to provide fluid passage interconnectors between chambers 33 and 35 in element 25. Port 67 is maintained normally closed by the ball type valve 71 which is biased towards its complementary valve seat in wall 37 by the spring element 73. The conventional mechanism 75 coupled to spring element 73 provides control and adjustment of the tension of spring element 73 and the pressure necessary in chamber 35 to open the valve 71. The conventional check valve 77 in port 69 normally prevents flow of fluid from chamber 35 to chamber 33 and permits flow in the opposite direction without restriction. The mechanism 79 which is coupled to check valve 77 and which may be of any suitable conventional design provides manual control of the disposition of the check valve 77 in port 69.

In operation, when the coupling elements 15 and 25 of the holdback apparatus 13 are to be interconnected so as to restrain the aircraft 3 from its launch until a predetermined launching force has been developed, the sleeve 53 of element 25 is first operated to its innermost retracted position in element 25. Rotary movement of sleeve 53 in the L-shaped slot 65 maintains the sleeve in its retracted position away from the annular groove 49 in the locking head 41 on the end of shaft 43 until the coupling operation is completed. The locking head 41 is then inserted into the annular opening formed by the inwardly directed ends of the flexible fingers 27 of element 15. The fingers 27 flex outwardly as they pass over the outwardly tapered surface of the locking head 41 and then move inwardly along the contiguous cammed surfaces of the fingers 29 and the groove 49 to their fully engaged position. The sleeve 53 is then operated to its normal extended position in element 25 where it overlies the ends of the fingers 27 in the groove and prevents their removal therefrom until the desired launching force is developed or until the interconnection is prematurely aborted in a manner which will be described more fully hereinafter.

During a launching operation, the launching force developed by the aircraft engine and the catapult device is applied to piston 39 in element 25 through the various components of the holdback device 13. As the axial load applied to piston 39 increases, the fluid pressure in chamber 35 similarly increases. When the pressure in chamber 35 exceeds the opposite preset bias of spring element 73 on the ball type valve 71, valve 71 opens. Fluid in chamber 35 then flows into chamber 33 through port 67 and the piston 39 quickly operates the shaft 43 and locking head 41 to their extended position beyond the point where sleeve 53 overlies the ends of fingers 27 of element 15. When this occurs, fingers 27 disengage themselves from the annular groove in element 25, the holdback device is released, and the aircraft begins its takeoff run. By adjusting mechanism 75, the bias of spring element 73 is varied so as to control the prelaunching force that must be developed before the holdback device will release. If for any reason it is desirable to manually abort the holdback device at any time, manual operation of the mechanism 79 vents fluid from chamber 35 to chamber 33 through port 69 so as to allow piston 39 and its attached shaft 43 and locking head 41 to move to its extended finger releasable position.

Obviously, many modifications and variations of the present invention are possible in the light of the above teachings. It is therefore to be understood that within the scope of the appended claims, the invention may be practiced otherwise than as specifically described.

I claim:

1. Apparatus for preliminarily restraining an aircraft on a launching surface from its launch, said apparatus comprising:
   a. a first coupling element secured to the aircraft, said first coupling element including a plurality of flexible fingers circumferentially disposed about the longitudinal axis of the element and extending substantially parallel thereto, each finger having an inwardly extending projection adjacent its outer extremity which with the inwardly extending projections of the other fingers defines a reduced diameter inner peripheral surface;
   b. a second coupling element secured to the aircraft launching surface, said second coupling element including a tapered locking head which moves on the longitudinal axis between a retracted position and an extended position, said locking head having an annular groove into which the flexible fingers of the first element snap when the tapered head is inserted in the reduced diameter surface of the first element;
   c. means for locking the flexible fingers in the groove in the tapered head when it occupies its retracted position;
   d. and means for controlling movement of the locking head between its retracted and extended positions.

2. The apparatus substantially as described in claim 1 wherein the means for locking the flexible fingers in the groove of the tapered locking head includes a sleeve that normally overlies the outer extremity of the flexible fingers and prevents their disengagement from the groove in the locking head when the locking head occupies retracted position.

3. The apparatus substantially as described in claim 2 wherein the sleeve is manually operable to a position where it allows movement of the fingers into engagement with the groove in the locking head when the locking head occupies its retracted position.

4. The apparatus substantially as described in claim 1 and further including a fluid system that controls movement of the locking head from its normally retracted position to its extended position when a predetermined tension between the coupling elements is exceeded.

5. The apparatus substantially as described in claim 4 wherein the fluid system includes means for controlling the tension between the coupling elements where the locking head moves to its extended position.

6. The apparatus substantially as described in claim 4 wherein the fluid system includes manually operable means for moving the locking head to its extended position at any time.

7. The apparatus substantially as described in claim 1 and further including means for controlling the relative rotational dispositions of the coupling elements in their coupled condition.